U S011465689B2

(12) United States Patent
Murata et al.

(10) Patent No.: US 11,465,689 B2
(45) Date of Patent: Oct. 11, 2022

(54) VEHICLE BODY STRUCTURE

(71) Applicant: Toyota Jidosha Kabushiki Kaisha, Toyota (JP)

(72) Inventors: Soshiro Murata, Nagoya (JP); Takashi Sagisaka, Miyoshi (JP); Ayaka Kagami, Inazawa (JP); Hidenori Tago, Fukuyama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 364 days.

(21) Appl. No.: 16/703,195

(22) Filed: Dec. 4, 2019

(65) Prior Publication Data

US 2020/0180704 A1 Jun. 11, 2020

(30) Foreign Application Priority Data

Dec. 6, 2018 (JP) .............................. JP2018-229288

(51) Int. Cl.
*B62D 25/20* (2006.01)
*B62D 27/02* (2006.01)
*B62D 21/15* (2006.01)

(52) U.S. Cl.
CPC ....... *B62D 25/2027* (2013.01); *B62D 21/152* (2013.01); *B62D 27/023* (2013.01)

(58) Field of Classification Search
CPC ... B62D 25/02; B62D 25/2027; B62D 25/202
See application file for complete search history.

(56) References Cited

U.S. PATENT DOCUMENTS

| 6,929,314 | B2 * | 8/2005 | Hanyu ............... B62D 25/2018 |
| | | | 296/203.02 |
| 2003/0071490 | A1 | 4/2003 | Nishikawa et al. |
| 2004/0080187 | A1 | 4/2004 | Tomita |
| 2010/0140977 | A1 | 6/2010 | Mori |
| 2011/0298246 | A1 | 12/2011 | Mildner |
| 2015/0001887 | A1 | 1/2015 | Saje et al. |

FOREIGN PATENT DOCUMENTS

| CN | 2590828 Y | 12/2003 |
| CN | 1511098 A | 7/2004 |
| CN | 101746421 A | 6/2010 |

(Continued)

*Primary Examiner* — James A English
*Assistant Examiner* — Matthew James O'Neill
(74) *Attorney, Agent, or Firm* — Dinsmore & Shohl LLP (57) ABSTRACT

There is provided a vehicle body structure, including: a die-cast rear floor side member; and a rocker rear inner; a joint section including: an upright wall configuring an inner side, in the vehicle width direction, of the rocker rear inner and extending along the vehicle vertical direction and the vehicle front-rear direction, and an outer joint section that is formed at the vehicle front-rear direction front end portion of the rear floor side member, that has an open cross-section profile, when sectioned along the vehicle vertical direction and the vehicle width direction, that is open toward an outer side in the vehicle width direction, that covers the rocker rear inner from the vehicle width direction inner side and that is joined to the rocker rear inner in a state in which a gap is provided between the outer joint section and the upright wall.

6 Claims, 5 Drawing Sheets

(56) References Cited

FOREIGN PATENT DOCUMENTS

| | | |
|---|---|---|
| CN | 201923209 U | 8/2011 |
| DE | 102007006722 A1 | 12/2008 |
| DE | 102010023075 A1 | 12/2011 |
| DE | 102015100265 A1 | 7/2016 |
| EP | 2749479 A1 | 7/2014 |
| JP | 405305878 A | 11/1993 |
| JP | 407323866 A | 12/1995 |
| JP | 2013-002210 A | 1/2013 |
| JP | 2013112210 A * | 6/2013 |
| WO | 2013/027602 A1 | 2/2013 |
| WO | WO-2016136339 A1 * | 9/2016 ........... B62D 21/157 |

\* cited by examiner

VEHICLE BODY STRUCTURE

CROSS-REFERENCE TO RELATED APPLICATION

This application is based on and claims priority under 35 USC 119 from Japanese Patent Application No. 2018-229288 filed on Dec. 6, 2018, the disclosure of which is incorporated BACKGROUND

TECHNICAL FIELD

The present disclosure relates to a vehicle body structure.

RELATED ART

DE 102007006722 discloses technology for joining a die-cast aluminum rear floor side member to a rocker. In this related technology, a bracket formed from a sheet member is attached to a rocker outer configuring a vehicle width direction outer side of the rocker, and the rear floor side member is joined to the rocker through the bracket by fastening with bolts.

However, in cases in which a rear floor side member is joined to a rocker through a bracket as described above, joint rigidity and joint strength of a joint section between the rear floor side member and the rocker are dependent on the strength and rigidity of the bracket, irrespective of the rigidity of the rear floor side member.

SUMMARY

In consideration of the above circumstances, the present disclosure provides a vehicle body structure capable of increasing joint rigidity and joint strength between a rear floor side member and a rocker, without being dependent on the strength and rigidity of a bracket.

A vehicle body structure according to a first aspect of the present disclosure includes: a die-cast rear floor side member that extends along a vehicle front-rear direction at an end portion, in a vehicle width direction, of a vehicle rear section; and a rocker rear inner that is provided at a rear side, in the vehicle front-rear direction, of a rocker extending along the vehicle front-rear direction at a vehicle side section, the rocker rear inner configuring an inner side, in the vehicle width direction, of a metal rocker rear having a cross-section profile sectioned along a vehicle vertical direction and the vehicle width direction of a profile formed with a closed cross-section area, and the rocker rear inner being joined to a front end portion, in the vehicle front-rear direction, of the rear floor side member; a joint section, at which the rocker rear inner and the vehicle front-rear direction front end portion of the rear floor side member are joined together, including: an upright wall configuring an inner side, in the vehicle width direction, of the rocker rear inner and extending along the vehicle vertical direction and the vehicle front-rear direction, and an outer joint section that is formed at the vehicle front-rear direction front end portion of the rear floor side member, that has an open cross-section profile, when sectioned along the vehicle vertical direction and the vehicle width direction, that is open toward an outer side in the vehicle width direction, that covers the rocker rear inner from the vehicle width direction inner side and that is joined to the rocker rear inner in a state in which a gap is provided between the outer joint section and the upright wall.

In the vehicle body structure according to the first aspect of the present disclosure, the die-cast rear floor side member extends along the vehicle front-rear direction at a vehicle width direction end portion of the vehicle rear section. The rocker extends along the vehicle front-rear direction at the vehicle side section, and the metal rocker rear is provided at a vehicle front-rear direction rear side of the rocker. The rocker rear has a cross-section profile when sectioned along a vehicle vertical direction and the vehicle width direction of a profile formed with a closed cross-section area. The vehicle front-rear direction front end portion of the rear floor side member is joined to the rocker rear inner configuring the vehicle width direction inner side of the rocker rear.

The rocker rear inner and the vehicle front-rear direction front end portion of the rear floor side member are joined together through the joint section. The joint section is configured including the upright wall configuring the vehicle width direction inner side of the rocker rear inner, and the outer joint section formed at the rear floor side member side. The upright wall of the rocker rear inner extends along the vehicle vertical direction and the vehicle front-rear direction. The outer joint section of the rear floor side member has a cross-section profile when sectioned along the vehicle vertical direction and the vehicle width direction of the open cross-section profile open toward the vehicle width direction outer side. The outer joint section covers the rocker rear inner from the vehicle width direction inner side and is joined to the rocker rear inner in a state in which a gap is provided between the outer joint section and the upright wall of the rocker rear inner.

Thus in the present disclosure, in joining the rear floor side member and the rocker rear inner together, the outer joint section is formed to the rear floor side member, and the outer joint section is installed such that the outer joint section covers the rocker rear inner from the vehicle width direction inner side and is joined to the rocker rear inner in the state in which a gap is provided between the outer joint section and the upright wall of the rocker rear inner.

Namely, the outer joint section forms a closed cross-section area against the rocker rear inner by providing the gap between the outer joint section and the upright wall of the rocker rear inner. This thereby increases the rigidity at the joint section where the rocker rear inner and the vehicle front-rear direction front end portion of the rear floor side member are joined together. The outer joint section is furthermore part of the rear floor side member formed by die-casting, and so in the present disclosure there is no need for a bracket to join the rear floor side member and the rocker rear inner together.

Generally there is a high degree of freedom for design with die-cast members formed by die-casting, and they may be formed so as to obtain a high rigidity by increasing the thickness according to location or by providing reinforcing ribs. By contrast, for example, since sheet members made from metal have a substantially uniform thickness, the rigidity of the sheet member is largely determined by the thickness. Thus from out of a die-cast member and a sheet member, the rigidity of a sheet member is highly likely to be lower. The joint strength and joint rigidity at a joint section where a die-cast member and a sheet member are joined together are thus dependent on the strength and rigidity of the sheet member.

By contrast, there is no need for a bracket as a sheet member in the present disclosure as described above. The outer joint section is formed to the rear floor side member formed by die-casting, and the outer joint section is joined to the rocker rear inner. The joint section between the rear floor side member and the rocker rear inner is accordingly capable of obtaining the high rigidity achieved by die-cast members.

A vehicle body structure according to a second aspect is the vehicle body structure according to the first aspect, wherein a recess recessed toward the upright wall side is provided at the outer joint section such that a recess-bottom wall is abutted against and joined to the upright wall.

In the vehicle body structure according to the second aspect of the present disclosure, the recess recessed toward the upright wall side formed to the rocker rear inner at the outer joint section formed to the rear floor side member is provided to the outer joint section such that the recess-bottom wall of the recess is abutted against and joined to the upright wall of the rocker rear inner.

As described above, in the first aspect of the present disclosure, the outer joint section of the rear floor side member covers and is joined to the rocker rear inner from the vehicle width direction inner side in the state in which there is a gap provided between the outer joint section and the upright wall of the rocker rear inner of the rocker rear. Namely, in the first aspect of the present disclosure, the joint section between the outer joint section of the rear floor side member and the rocker rear inner includes, for example, a joint location (first joint location) where the outer joint section is joined to a wall (upper wall) at the vehicle vertical direction upper side of the upright wall of the rocker rear inner, and a joint location (first joint location) where the outer joint section is joined to a wall (lower wall) at the vehicle vertical direction lower side of the upright wall of the rocker rear inner.

In the vehicle body structure according to the second aspect of the present disclosure, the recess is provided to the outer joint section, and there is a joint location (second joint location) where the recess-bottom wall of the recess is joined to the upright wall of the rocker rear inner. Thus at the joint section between the rear floor side member and the rocker rear inner, the upright wall of the rocker rear inner accordingly includes an additional second joint location. This thereby enables the joint rigidity to be increased in comparison to cases in which only the first joint locations are provided, by an amount commensurate with the increase in the number of joint locations. Thus the vehicle front-rear direction front end portion of the rear floor side member is thereby constrained from deforming.

A vehicle body structure according to a third aspect of the present disclosure is the vehicle body structure according to the second aspect of the present disclosure, wherein a rib linked to a sidewall of the recess is formed along the vehicle front-rear direction inside the recess.

In the vehicle body structure according to the third aspect of the present disclosure, the rib linked to the sidewall of the recess is formed running along the vehicle front-rear direction inside the recess, reinforcing the recess.

A vehicle body structure according to a fourth aspect of the present disclosure is the vehicle body structure according to the third aspect, wherein respective joint locations are provided inside the recess at positions at an upper side, in the vehicle vertical direction, and at a lower side, in the vehicle vertical direction, of the rib.

In the vehicle body structure according to the fourth aspect of the present disclosure, providing the joint locations inside the recess at positions to the vehicle vertical direction upper side and the vehicle vertical direction lower side of the rib enables the joint rigidity to be increased at the joint section between the rear floor side member and the rocker rear inner.

A vehicle body structure according to a fifth aspect of the present disclosure is the vehicle body structure according to any aspect of the first aspect to the fourth aspect, wherein: the rocker rear inner further includes: an upper wall provided at an upper side, in the vehicle vertical direction, of the upright wall and linked to the upright wall, and a lower wall provided at a lower side, in the vehicle vertical direction, of the upright wall, and linked to the upright wall so as to be disposed opposing the upper wall; and the outer joint section further includes: a joint upper wall abutted against and joined to the upper wall, and a joint lower wall abutted against and joined to the lower wall.

In the vehicle body structure according to the fifth aspect of the present disclosure, the rocker rear inner further includes the upper wall provided at the vehicle vertical direction upper side of the upright wall and the lower wall provided at the vehicle vertical direction lower side of the upright wall. The upright wall and the lower wall are disposed so as to face each other and are formed so as to be respectively linked to the upper wall.

The outer joint section of the rear floor side member further includes the joint upper wall and the joint lower wall respectively corresponding to the upper wall and the lower wall of the rocker rear inner. The joint upper wall of the outer joint section abuts against and is joined to the upper wall of the rocker rear inner, and the joint lower wall of the outer joint section abuts against and is joined to the lower wall of the rocker rear inner.

Thus in the present disclosure the number of joining faces is increased due to the recess-bottom wall of the recess, the joint upper wall, and the joint lower wall of the outer joint section on the rear floor side member being respectively joined to the upright wall, the upper wall, and the lower wall of the rocker rear inner. This thereby enables the joint strength to be further increased at the joint section between the rear floor side member and the rocker rear inner.

The first aspect of the present disclosure exhibits the effect of being able to increase the joint rigidity and joint strength between the rear floor side member and the rocker without being dependent on the strength and rigidity of a bracket.

The second aspect of the present disclosure exhibits the effect of being able to suppress out-of-plane deformation at the vehicle front-rear direction front end portion of the rear floor side member in a rear-end collision of a vehicle.

The third aspect of the present disclosure exhibits the effect of being able to increase the rigidity of the vehicle front-rear direction front end portion of the rear floor side member.

The fourth aspect of the present disclosure exhibits the effect of increasing the joint rigidity at the joint section between the rear floor side member and the rocker rear inner, and thereby enabling higher steering stability to be achieved.

The fifth aspect of the present disclosure exhibits the effect of enabling transmission of collision load from the rocker rear inner to the rocker side to be achieved efficiently in a rear-end collision of a vehicle by increasing the joint strength at the joint section between the rear floor side member and the rocker rear inner.

BRIEF DESCRIPTION OF THE DRAWINGS

Exemplary embodiments of the present disclosure will be described in detail based on the following figures, wherein.

DETAILED DESCRIPTION

Explanation follows regarding a vehicle body (vehicle) applied with a vehicle body structure according to an exemplary embodiment of the present disclosure. Note that in the respective drawings, the arrow FR indicates a vehicle front-rear direction front side, and the arrow UP indicates a vehicle vertical direction upper side, as appropriate. The arrow OUT indicates a vehicle width direction outer side. Unless specifically stated otherwise, in the below explanation, simple reference to front and rear, left and right, and up and down directions refers to front and rear in the vehicle front-rear direction, left and right in the vehicle left-right direction (vehicle width direction), and up and down in the vehicle vertical direction.

Configuration of Vehicle Body Structure

First, explanation is given regarding configuration of the vehicle body structure according to the present exemplary embodiment.

Figure 1:
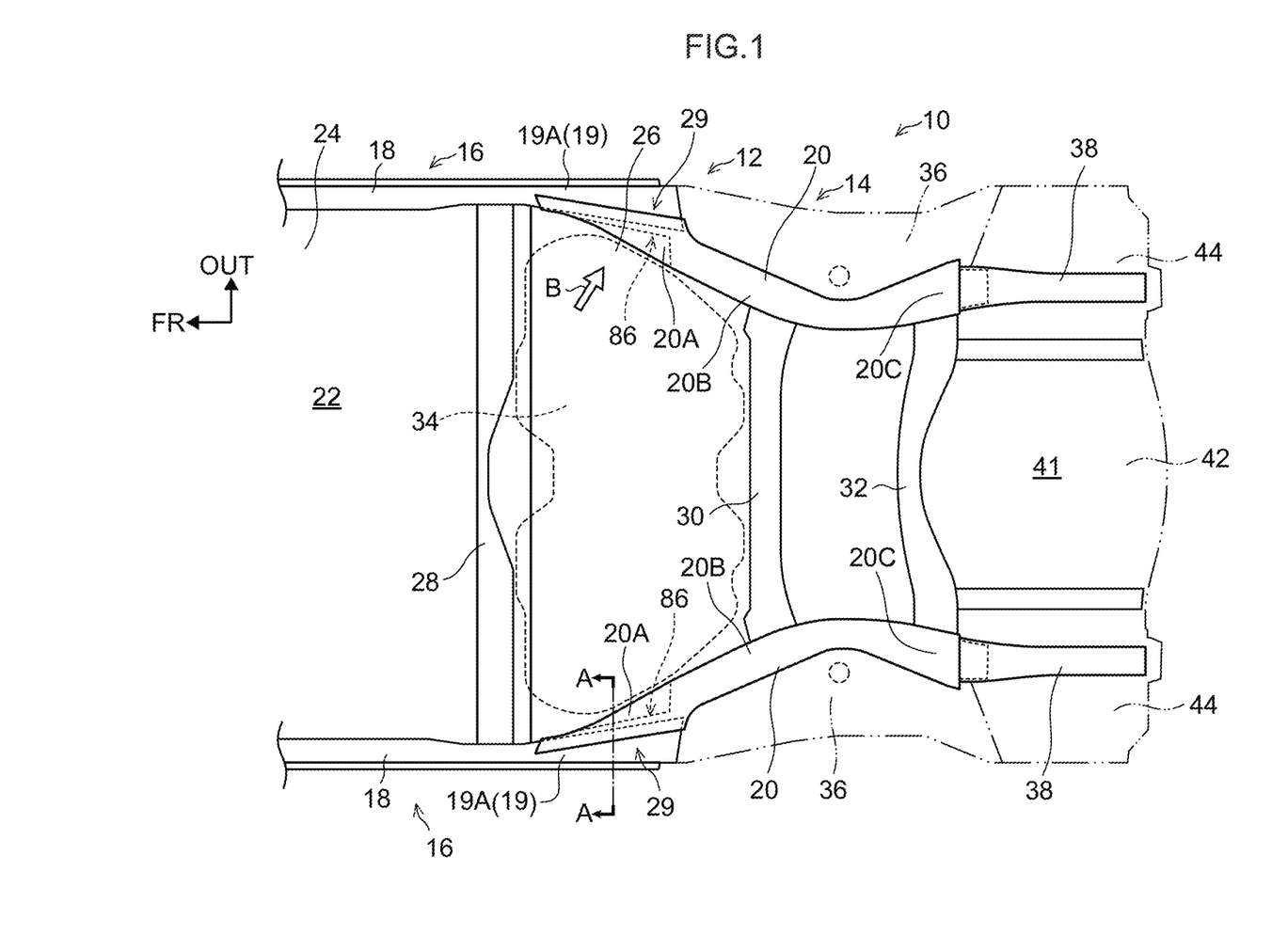
FIG. 1 is a plan view illustrating a rear side of a vehicle lower side applied with a vehicle body structure according to an exemplary embodiment of the present disclosure.

FIG. 1 is a plan view illustrating a rear section (hereafter referred to as "vehicle rear section") 14 side of a vehicle 10 applied with the vehicle body structure according to the present exemplary embodiment, illustrating a lower section (hereafter referred to as "vehicle lower section") 12 of the vehicle 10.

As illustrated in FIG. 1, left and right rockers 18 are provided extending along the vehicle front-rear direction at side sections (hereafter referred to as "vehicle side sections") 16 of the vehicle 10. A cross-section profile of each of the left and right rockers 18 when sectioned along a direction orthogonal to the length direction of the rocker 18 (i.e. the vehicle vertical direction and the vehicle width direction) is a closed cross-section profile. The left and right rockers 18 configure parts of framework of the respective vehicle side sections 16.

A floor panel 24, configuring a floor surface of a vehicle cabin interior (cabin) 22, is provided extending along the vehicle front-rear direction and the vehicle width direction between the left and right rockers 18. The two vehicle width direction end portions of the floor panel 24 are respectively joined to the left and right rockers 18. A rocker rear 19 extends along the vehicle front-rear direction at the vehicle front-rear direction rear side of each of the left and right rockers 18, and each of the rockers 18 is joined together with the corresponding rocker rear 19 to form a single unit. Obviously, the rockers 18 and the respective rocker rears 19 may be formed as integral units.

A floor cross member 28 is installed extending along the vehicle width direction between vehicle front-rear direction front end portions 19A of the left and right rocker rears 19. The floor cross member 28 is joined to the top of the floor panel 24. Vehicle front-rear direction front end portions 20A of rear floor side members 20 that extend along the vehicle front-rear direction are joined to the vehicle width direction inner sides of the respective left and right rocker rears 19 (at joint sections 29, described later).

Figure 2:
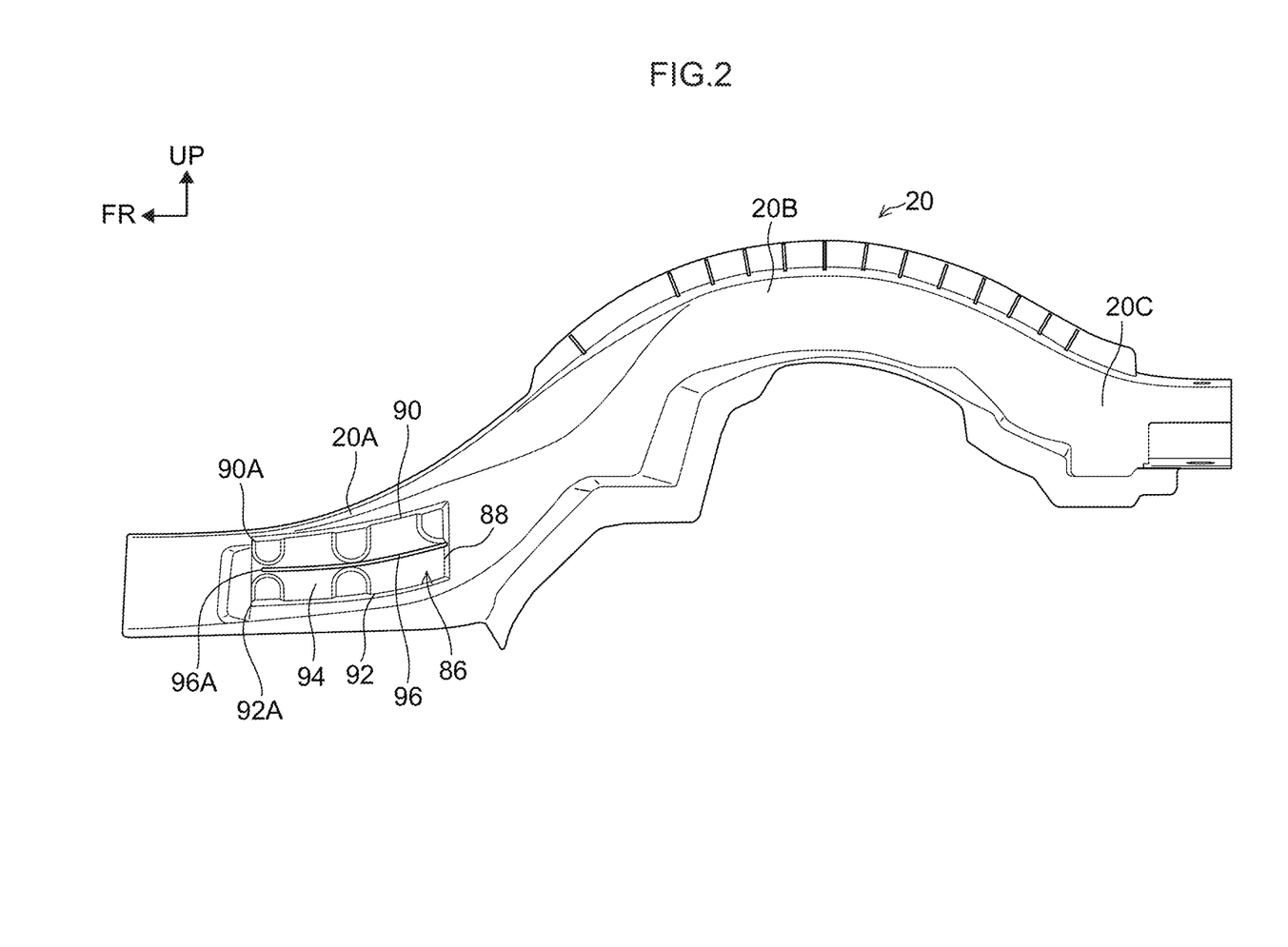
FIG. 2 is a side view illustrating a rear floor side member configuring part of a vehicle body structure according to an exemplary embodiment of the present disclosure.

Each of the rear floor side members 20 is curved so as to project toward the vehicle width direction inner side in plan view, and curved so as to project toward the vehicle vertical direction upper side in vehicle side view, as illustrated in FIG. 2. Note that FIG. 2 illustrates one of the rear floor side members 20 in side view.

As illustrated in FIG. 1, a central floor panel 26, configuring the floor surface at a rear section side of the vehicle cabin interior 22, is provided between the left and right rear floor side members 20. The central floor panel 26 extends along the vehicle front-rear direction and the vehicle width direction, and is positioned at the vehicle front-rear direction rear side of the floor panel 24. The left and right rear floor side members 20 are respectively joined to the two vehicle width direction end portions of the central floor panel 26.

A floor cross member 30 is installed extending along the vehicle width direction between the left and right rear floor side members 20 at vehicle front-rear direction center portions 20B of the left and right rear floor side members 20. The floor cross member 30 is joined to the top of the central floor panel 26.

A floor cross member 32 is installed extending along the vehicle width direction between the left and right rear floor side members 20 at vehicle front-rear direction rear end portions 20C of the rear floor side members 20. Similarly to the floor cross member 30 described above, the floor cross member 32 is also joined to the top of the central floor panel 26.

Note that a fuel tank 34 is installed at the lower side of the central floor panel 26 between vehicle front-rear direction front portion sides of the left and right rear floor side members 20, namely, between the floor cross member 28 and the floor cross member 30. Moreover, suspension towers 36 etc. with attached shock absorbers are respectively provided at the vehicle width direction outer sides of the left and right rear floor side members 20.

Rear floor side member rears 38 respectively extend along the vehicle front-rear direction at the vehicle front-rear direction rear side of the left and right rear floor side members 20. A rear floor panel 42, configuring a floor surface of a luggage compartment interior 41, is provided extending along the vehicle front-rear direction and the vehicle width direction at the vehicle front-rear direction rear side of the central floor panel 26.

Rear floor side panels 44 are respectively provided extending along the vehicle front-rear direction and the vehicle width direction at the two vehicle width direction outer sides of the rear floor panel 42. The left and right rear floor side member rears 38 are respectively joined to the rear floor side panels 44.

Explanation follows regarding the joint sections 29 between the rocker rears 19 and the rear floor side members 20.

Figure 3:
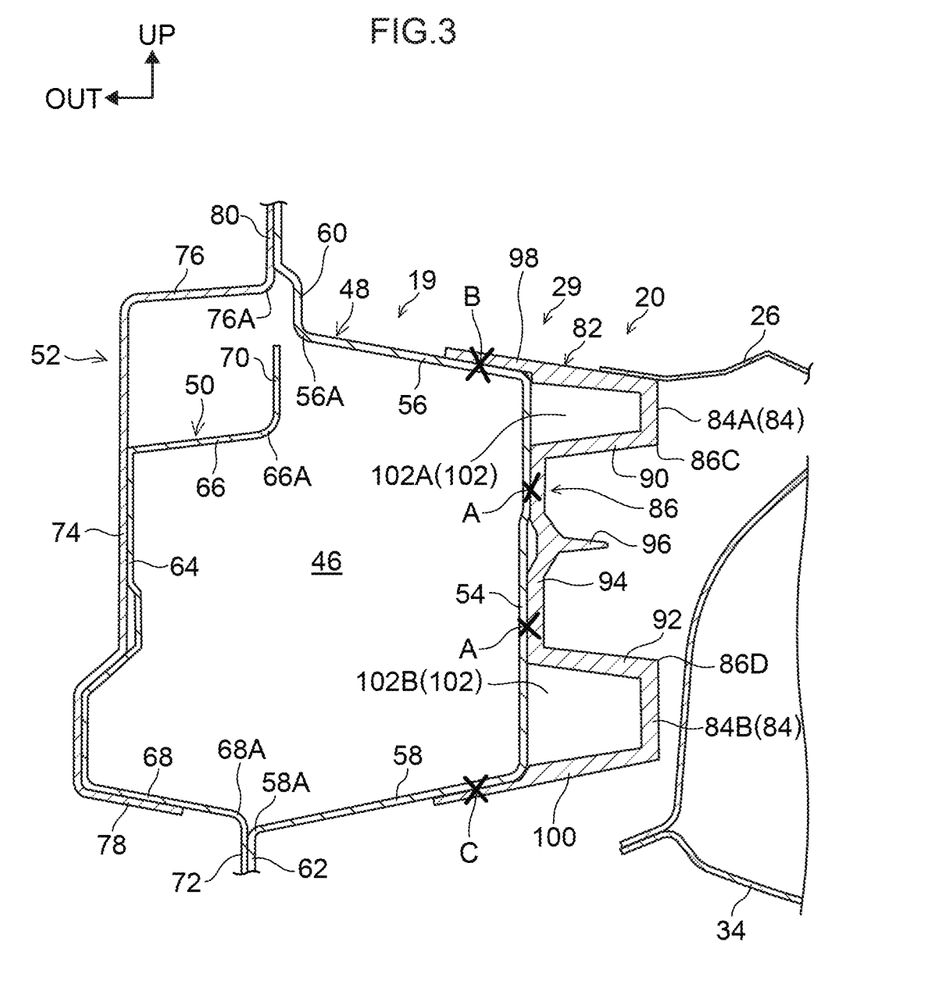
FIG. 3 is a cross-section illustrating a joint section between a rocker rear and a rear floor side member at a cross-section position when sectioned along line A-A in FIG. 1.
Figure 4:
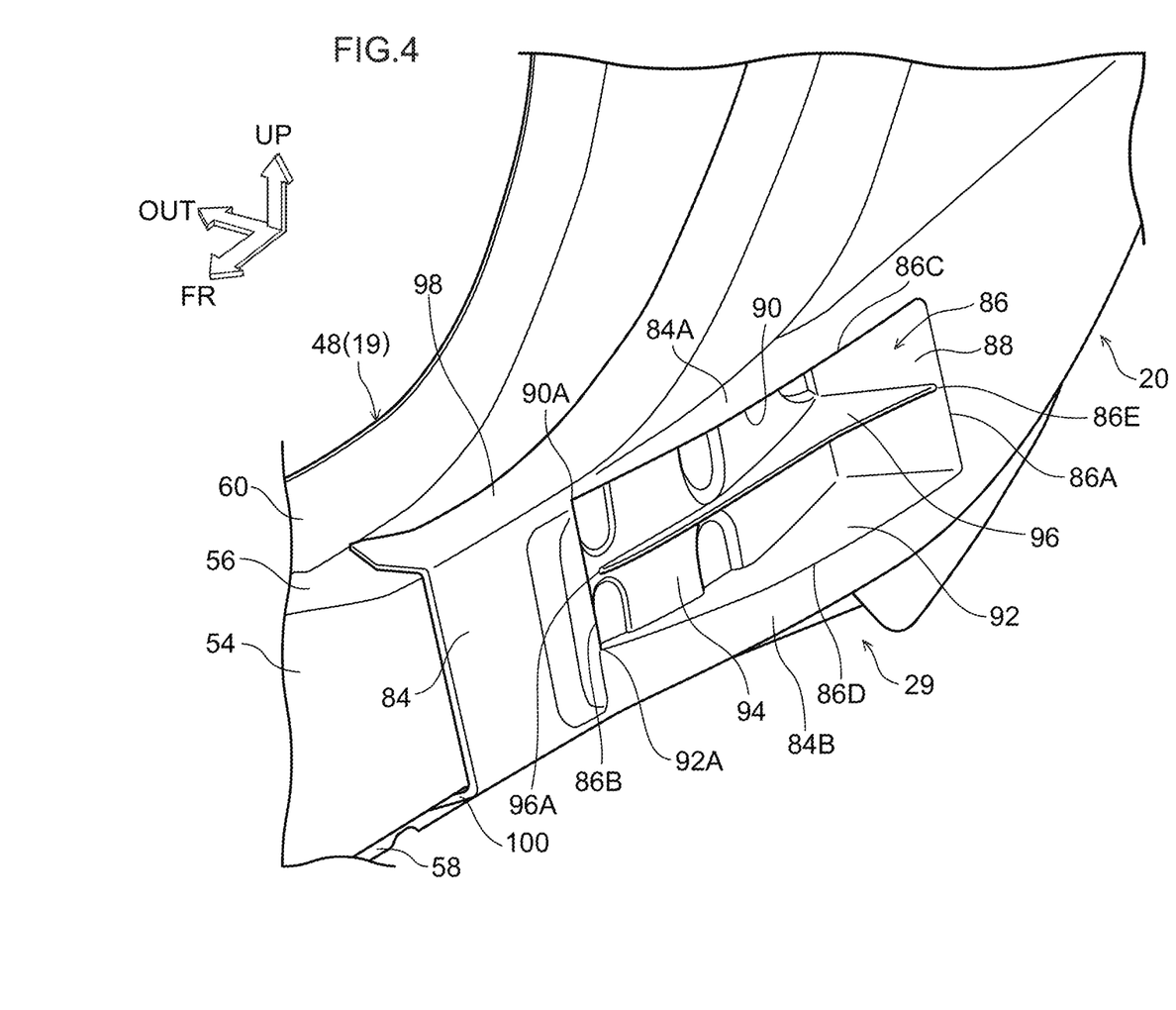
FIG. 4 is a drawing illustrating a joint section between a rocker and a rear floor side member as viewed along the direction of arrow B in FIG. 1.

FIG. 3 illustrates a cross-section profile of one of the joint sections 29 between the rocker rears 19 and the rear floor side members 20 at a cross-section position when sectioned along line A-A in FIG. 1. FIG. 4 illustrates the joint section 29 as viewed along the direction of arrow B in FIG. 1.

As illustrated in FIG. 3 and FIG. 4, in the present exemplary embodiment, the rear floor side member 20 is, for example, formed of die-cast aluminum using a mold with mold-opening along the vehicle width direction of the rear floor side member 20. Note that the rear floor side member 20 is not limited to being formed of aluminum, and may be a die-cast article formed of an alloy of zinc, magnesium, copper, or the like, or may be a casting formed using a sand mold. Each of the rocker rears 19 is, for example, formed from sheet steel. Note that there is no limitation to sheet steel, and the rear floor side member rear 38 may obviously be formed using a sheet member using another metal such as an aluminum alloy.

A cross-section profile of each of the rocker rears 19 when sectioned along the vehicle vertical direction and the vehicle width direction is formed with a closed cross-section area 46 (described later). Each of the rocker rears 19 is configured including a sheet shaped rocker rear inner 48 configuring a vehicle width direction inner side of the rocker rear 19, and a sheet shaped rocker rear outer 50 configuring a vehicle width direction outer side of the rocker rear 19.

The rocker rear inner 48 and the rocker rear outer 50 are joined together by welding or the like to form a single unit. The vehicle front-rear direction front end portion 20A of the corresponding rear floor side member 20 is joined to the rocker rear inner 48. The rocker rear 19 does not necessary always have to be configured including the rocker rear inner 48 and the rocker rear outer 50, and the rocker rear inner 48 and the rocker rear outer 50 may be formed as an integrated unit.

A side member outer 52, configuring a styling face of the corresponding vehicle side section 16, is provided at the vehicle width direction outer side of the rocker rear 19. Although the closed cross-section area 46 is formed between the side member outer 52 and the rocker rear inner 48 in FIG. 3, the closed cross-section area 46 is formed between the rocker rear inner 48 and the rocker rear outer 50 at other vehicle front-rear direction positions.

Rocker Rear Inner

Explanation follows regarding the rocker rear inner 48.

As illustrated in FIG. 3, a cross-section profile of the rocker rear inner 48 when sectioned along the vehicle vertical direction and the vehicle width direction is formed with a substantially hat shaped profile open toward the vehicle width direction outer side. An upright wall 54, formed along the vehicle front-rear direction and the vehicle vertical direction, is provided at a vehicle vertical direction center portion of the rocker rear inner 48.

An upper wall 56 that is linked to the upright wall 54 is formed along the vehicle front-rear direction and the vehicle width direction at the vehicle vertical direction upper side of the upright wall 54. A lower wall 58 that is linked to the upright wall 54 is formed along the vehicle front-rear direction and the vehicle width direction at the vehicle vertical direction lower side of the upright wall 54 so as to oppose the upper wall 56.

An upper flange 60 extends toward the vehicle vertical direction upper side from a vehicle width direction outer end 56A of the upper wall 56, and a lower flange 62 extends toward the vehicle vertical direction lower side from a vehicle width direction outer end 58A of the lower wall 58.

Rocker Rear Outer

Explanation follows regarding the rocker rear outer 50.

A cross-section profile of the rocker rear outer 50 when sectioned along the vehicle vertical direction and the vehicle width direction is formed with a substantially hat shaped profile open toward the vehicle width direction inner side. An upright wall 64 is formed along the vehicle front-rear direction and the vehicle vertical direction so as to oppose the upright wall 54 of the rocker rear inner 48.

An upper wall 66 that is linked to the upright wall 64 is formed along the vehicle front-rear direction and the vehicle width direction at the vehicle vertical direction upper side of the upright wall 64. A lower wall 68 that is linked to the upright wall 64 is formed along the vehicle front-rear direction and the vehicle width direction at the vehicle vertical direction lower side of the upright wall 64 so as to oppose the upper wall 66.

An upper flange 70 extends toward the vehicle vertical direction upper side from a vehicle width direction inner end 66A of the upper wall 66, and a lower flange 72 extends toward the vehicle vertical direction lower side from a vehicle width direction inner end 68A of the lower wall 68. Note that lower flange 72 is overlapped and joined together with the lower flange 62 of the rocker rear inner 48.

Side Member Outer

Explanation follows regarding the side member outer 52.

A cross-section profile of the side member outer 52 when sectioned along the vehicle vertical direction and the vehicle width direction is formed with a substantially hat shaped profile open toward the vehicle width direction inner side. An upright wall 74 that overlaps the upright wall 64 of the rocker rear outer 50 is formed along the vehicle front-rear direction and the vehicle vertical direction.

An upper wall 76 that is linked to the upright wall 74 is formed along the vehicle front-rear direction and the vehicle width direction at the vehicle vertical direction upper side of the upright wall 74. A lower wall 78 that is linked to the upright wall 74 is formed along the vehicle front-rear direction and the vehicle width direction at the vehicle vertical direction lower side of the upright wall 74 so as to oppose the upper wall 76. Note that the lower wall 78 is overlapped and joined together with the lower wall 68 of the rocker rear outer 50.

An upper flange 80 extends toward the vehicle vertical direction upper side from a vehicle width direction inner end 76A of the upper wall 76. The upper flange 80 is overlapped and joined together with the upper flange 60 of the rocker rear inner 48. Note that as described above, the lower wall 78 of the side member outer 52 is overlapped and joined together with the lower wall 68 of the rocker rear outer 50, and so a so-called lower flange is not formed thereat.

Rear Floor Side Member

Explanation follows regarding the rear floor side member 20.

As described above, the rocker rear inner 48 configuring the vehicle width direction inner side of the rocker rear 19 and the vehicle front-rear direction front end portion 20A of the rear floor side member 20 are joined at the joint section 29.

In simple terms, the vehicle front-rear direction front end portion 20A of the rear floor side member 20 is provided with an outer joint section 82, and the outer joint section 82 covers the rocker rear inner 48 from the vehicle width direction inner side so as to be joined to the rocker rear inner 48.

A cross-section profile of the outer joint section 82 of the rear floor side member 20 when sectioned along the vehicle vertical direction and the vehicle width direction is an open cross-section profile open toward the vehicle width direction outer side. The outer joint section 82 is further provided with an upright wall 84 formed along the vehicle front-rear direction and the vehicle vertical direction at a vehicle vertical direction center portion of the outer joint section 82. A vehicle vertical direction center portion of the upright wall 84 is formed with a recess 86 that is recessed toward the side of the upright wall 54 of the rocker rear inner 48. The upright wall 84 is split by the recess 86 into an upper side upright wall portion 84A and a lower side upright wall portion 84B at a region of the upright wall 54 corresponding to where the recess 86 is formed.

As illustrated in FIG. 4, the recess 86 has a substantially rectangular shape in side view, and is provided so as to be recessed along both the vehicle vertical direction and the vehicle front-rear direction. The upright wall 84 is formed so as to approach the upright wall 54 of the rocker rear inner 48 in a gentle arc toward the vehicle width direction outer side on progression toward the vehicle front-rear direction front side.

The depth of the recess 86 thus becomes gradually shallower on progression in the vehicle front-rear direction toward from a rear end 86A toward a front end 86B of the recess 86. Accordingly, in the present exemplary embodiment, although a rear wall (sidewall) 88 is present at the position of the rear end 86A of the recess 86, there is no front wall linked to the upright wall 84 present at the position of the front end 86B of the recess 86.

An upper wall 90 positioned at a vehicle vertical direction upper end 86C of the recess 86 and a lower wall 92 positioned at a vehicle vertical direction lower end 86D of the recess 86 are therefore formed with triangular shapes having respective apexes at vehicle front-rear direction front ends 90A, 92A in plan view. Obviously front walls may be formed to the recess 86.

A recess-bottom wall 94 of the recess 86 is capable of abutting the upright wall 54 of the rocker rear inner 48 illustrated in FIG. 3. As illustrated in FIG. 3, the recess-bottom wall 94 of the recess 86 is joinable to the upright wall 54 of the rocker rear inner 48 in a state in which the recess-bottom wall 94 of the recess 86 abuts against the upright wall 54 of the rocker rear inner 48.

As illustrated in FIG. 4, a rib 96 is formed at the inside of the recess 86 so as to run along the vehicle front-rear direction and span between the recess-bottom wall 94 and the rear wall 88 at a vehicle vertical direction substantially center portion 86E of the recess 86. The rib 96 is formed with a triangular shape having an apex at a vehicle front-rear direction front end 96A in plan view.

A joint upper wall 98 linked to the upright wall 84 and formed along the vehicle front-rear direction and the vehicle width direction is provided at the vehicle vertical direction upper side of the upright wall 84. The joint upper wall 98 is joinable to the upper wall 56 of the rocker rear inner 48 in a state abutted against the upper wall 56.

A joint lower wall 100 formed along the vehicle front-rear direction and the vehicle width direction is provided linked to the upright wall 84 at the vehicle vertical direction lower side of the upright wall 84 so as to oppose the joint upper wall 98. The joint lower wall 100 is joinable to the lower wall 58 of the rocker rear inner 48 in a state abutted against the lower wall 58.

As illustrated in FIG. 3, due to the present exemplary embodiment having the configuration described above, gaps 102 are provided between the upright wall 54 and the upright wall 84 of the outer joint section 82 in a state in which the recess-bottom wall 94 of the recess 86 provided in the outer joint section 82 of the rear floor side member 20 is abutted against the upright wall 54 of the rocker rear inner 48.

Moreover, the recess-bottom wall 94 of the recess 86 is joined to the upright wall 54 of the rocker rear inner 48 (at a joint locations A) in a state in which the recess-bottom wall 94 of the recess 86 is abutted against the upright wall 54 of the rocker rear inner 48. The joint upper wall 98 of the outer joint section 82 is joined to the upper wall 56 of the rocker rear inner 48 (at a joint location B) in a state in which the joint upper wall 98 of the outer joint section 82 of the rear floor side member 20 is abutted against the upper wall 56 of the rocker rear inner 48. Note that the gaps 102 are partitioned into an upper portion 102A and a lower portion 102B by the recess 86.

The joint lower wall 100 of the outer joint section 82 is joined to the lower wall 58 of the rocker rear inner 48 (at a joint location C) in a state in which the joint lower wall 100 of the outer joint section 82 of the rear floor side member 20 is abutted against the lower wall 58 of the rocker rear inner 48. Note that the naming of joint location A, the joint location B, and the joint location C does not indicate the sequence of joining.

At the joint section 29, the outer joint section 82 provided at the front end portion 20A of the rear floor side member 20 is joined to the outer side of the rocker rear inner 48 of the rocker rear 19 by one-sided joining using flow drill screws (FDS) or the like, or by double-sided joining using self-piercing rivets (SPR) or the like. Note that in the present exemplary embodiment, one-sided joining is performed at the joint location A, the joint location B, and the joint location C, however depending on the location, double-sided joining may also be performed.

Operation and Effects of Vehicle Body Structure

Explanation follows regarding operation and effects of the vehicle body structure according to the present exemplary embodiment.

In the present exemplary embodiment, the rear floor side members 20 that extend along the vehicle front-rear direction at the vehicle width direction end portions of the vehicle rear section 14 illustrated in FIG. 1 are formed from die-cast aluminum. The rocker rear 19 is formed from a steel sheet. The vehicle front-rear direction front end portion 20A of the rear floor side member 20 is joined (at the joint section 29) to the rocker rear inner 48 configuring the vehicle width direction inner side of the corresponding rocker rear 19.

The joint section 29 is configured including the upright wall 54 configuring the vehicle width direction inner side of the rocker rear inner 48, and the outer joint section 82 formed on the rear floor side member 20 side. The upright wall 54 of the rocker rear inner 48 extends along the vehicle vertical direction and the vehicle front-rear direction, and the cross-section profile of the outer joint section 82 of the rear floor side member 20 when sectioned along the vehicle vertical direction and the vehicle width direction is an open cross-section profile open toward the vehicle width direction outer side. The outer joint section 82 covers the rocker rear inner 48 from the vehicle width direction inner side, and is joined to the rocker rear inner 48, in a state in which the gaps 102 are provided between the rocker rear inner 48 and the upright wall 54.

Thus in the present exemplary embodiment, due to providing the gaps 102 between the outer joint section 82 of the rear floor side member 20 and the upright wall 54 of the rocker rear inner 48 in this manner, so-called closed cross-section areas are formed between the outer joint section 82 and the rocker rear inner 48, thereby increasing rigidity at the joint section 29 where the rocker rear inner 48 and the outer joint section 82 of the rear floor side member 20 are joined together. Moreover, in the present exemplary embodiment, since the outer joint section 82 configures part of the rear floor side member 20, which is formed by die-casting, a bracket is not needed for joining the rear floor side member 20 and the rocker rear inner 48 together.

Generally there is a high degree of freedom for design with die-cast members formed by die-casting, and they may be formed so as to obtain a high rigidity by increasing the thickness according to location or by providing reinforcing ribs. By contrast, since sheet members made from metal such as brackets or the like have a substantially uniform thickness, the rigidity of the sheet member is largely determined by the thickness. Although the thickness of sheet members can be increased in order to set a higher rigidity, so doing would increase the weight of the vehicle.

Accordingly, out of die-cast automotive members and sheet shaped automotive members, sheet members are likely to have lower rigidity as a result of suppressing an increase in weight of the vehicle. The joint strength and joint rigidity at a joint section where a die-cast member and a sheet member are joined together are thus dependent on the strength and rigidity of the sheet member.

By contrast, in the present exemplary embodiment, as described above, the outer joint section 82 is formed to the rear floor side member 20 that is formed by die-casting, and the outer joint section 82 is joined to the rocker rear inner 48. The joint section 29 between the rear floor side member 20 and the rocker rear inner 48 is accordingly capable of obtaining the high rigidity achieved by die-cast members.

Namely, in the present exemplary embodiment, the joint rigidity and joint strength between the rear floor side member 20 and the rocker 18 (rocker rear 19) can be increased. This enables a higher steering stability to be achieved in the vehicle 10 (see FIG. 1), and enables a reduction in reinforcement members such as patches, thereby enabling a reduction in the number of components.

In the present exemplary embodiment, the recess 86 recessed toward the upright wall 54 formed to the rocker rear inner 48 is provided in the upright wall 84 of the outer joint section 82 formed to the rear floor side member 20. This enables the rigidity of the upright wall 84 of the outer joint section 82 to be increased. Moreover, the recess-bottom wall 94 of the recess 86 is abutted against and joined to the upright wall 54 of the rocker rear inner 48.

As described above, in the present exemplary embodiment, the outer joint section 82 of the rear floor side member 20 covers the rocker rear inner 48 from the vehicle width direction inner side and is joined to the rocker rear inner 48 in a state in which the gaps 102 are provided between the outer joint section 82 and the upright wall 54 of the rocker rear inner 48.

Namely, the joint section 29 between the outer joint section 82 of the rear floor side member 20 and the rocker rear inner 48 includes both the joint location B where the joint upper wall 98 of the outer joint section 82 and the upper wall 56 of the rocker rear inner 48 are joined, and also the joint location C where the joint lower wall 100 of the outer joint section 82 and the lower wall 58 of the rocker rear inner 48 are joined. Moreover, in the present exemplary embodiment, in addition to the joint locations B and C, the joint section 29 also includes the joint locations A where the recess-bottom wall 94 of the recess 86 formed to the outer joint section 82 and the upright wall 54 of the rocker rear inner 48 are joined together.

Due to adding the joint locations A at the upright wall 54 of the rocker rear inner 48 to the joint section 29 between the rear floor side member 20 and the rocker rear inner 48 in this manner, the joint rigidity can be increased by an amount commensurate with the additional joint locations in comparison to cases in which only the joint locations B and C are provided. This enables deformation of the outer joint section 82 of the rear floor side member 20 to be restrained, enabling out-of-plane deformation of the outer joint section 82 at the vehicle front-rear direction front end portion of the rear floor side member 20 to be suppressed in a rear-end collision of the vehicle 10 (see FIG. 1).

Moreover, in the present exemplary embodiment, the rib 96 that is linked to the recess-bottom wall 94 and the rear wall 88 of the recess 86 is formed running the vehicle front-rear direction at the inside of the recess 86. This reinforces the recess 86, enabling the rigidity of the outer joint section 82 of the rear floor side member 20 to be increased.

Note that although the rib 96 is formed running along the vehicle front-rear direction within the recess 86 in the present exemplary embodiment, there is no limitation thereto. For example, although not illustrated in the drawings, a rib may be formed running along the vehicle vertical direction at the inside of the recess 86, thereby enabling the rigidity to be increased at the outer joint section 82 of the rear floor side member 20. Alternatively, not only at the inside of the recess 86, a rib may also be provided on a reverse face side of the upright wall 54 (the upright wall 54 of the rocker rear inner 48). Namely, the rigidity can be increased at the outer joint section 82 by rib forming.

In the present exemplary embodiment, the joint locations A are respectively provided at positions to the vehicle vertical direction upper side and the vehicle vertical direction lower side of the rib 96 at the inside of the recess 86. This enables the joint rigidity to be increased at the joint section 29 between the rear floor side member 20 and the rocker rear inner 48. This thereby enables a higher steering stability to be achieved for the vehicle 10 (see FIG. 1).

In the present exemplary embodiment, the rocker rear inner 48 includes the upper wall 56 provided at the vehicle vertical direction upper side of the upright wall 54, and the lower wall 58 provided at the vehicle vertical direction lower side of the upright wall 54. The upper wall 56 and the lower wall 58 are each formed so as to be linked to the upright wall 54 and disposed so as to oppose each other.

The outer joint section 82 of the rear floor side member 20 includes the joint upper wall 98 and the joint lower wall 100, corresponding to the upper wall 56 and the lower wall 58 of the rocker rear inner 48 respectively. The joint upper wall 98 of the outer joint section 82 is abutted against and joined to the upper wall 56 of the rocker rear inner 48 (at the joint location B), and the joint lower wall 100 of the outer joint section 82 is abutted against and joined to the lower wall 58 of the rocker rear inner 48 (at the joint location C).

In this manner, on the outer joint section 82 of the rear floor side member 20 in the present exemplary embodiment, the recess-bottom wall 94 of the recess 86, the joint upper wall 98, and the joint lower wall 100 are respectively joined to the upright wall 54, the upper wall 56, and the lower wall 58 of the rocker rear inner 48. The present exemplary embodiment thereby enables the number of joining faces at the joint section 29 between the rear floor side member 20 and the rocker rear inner 48 to be increased, and the joint strength to be further increased.

By increasing the joint strength at the joint section 29 between the rear floor side member 20 and the rocker rear inner 48 in this manner, the present exemplary embodiment enables transmission of collision load from the rocker rear inner 48 (the rocker rear 19) to the rocker 18 (see FIG. 1) side to be achieved efficiently in a rear-end collision of the vehicle 10 (see FIG. 1).

Namely, in the present exemplary embodiment, accompanying a switch in the vehicle 10 (see FIG. 1) to die-cast aluminum for the rear floor side member 20, there is an increase in the ability to withstand the collision load of a rear-end collision, and the collision load can be transmitted to the rocker 18 (see FIG. 1) side. In other words, in a rear-end collision of the vehicle 10 (see FIG. 1), the rear floor side member 20 transmits collision load to the rocker 18 (see FIG. 1) side with a short stroke and without breaking.

Figure 5:
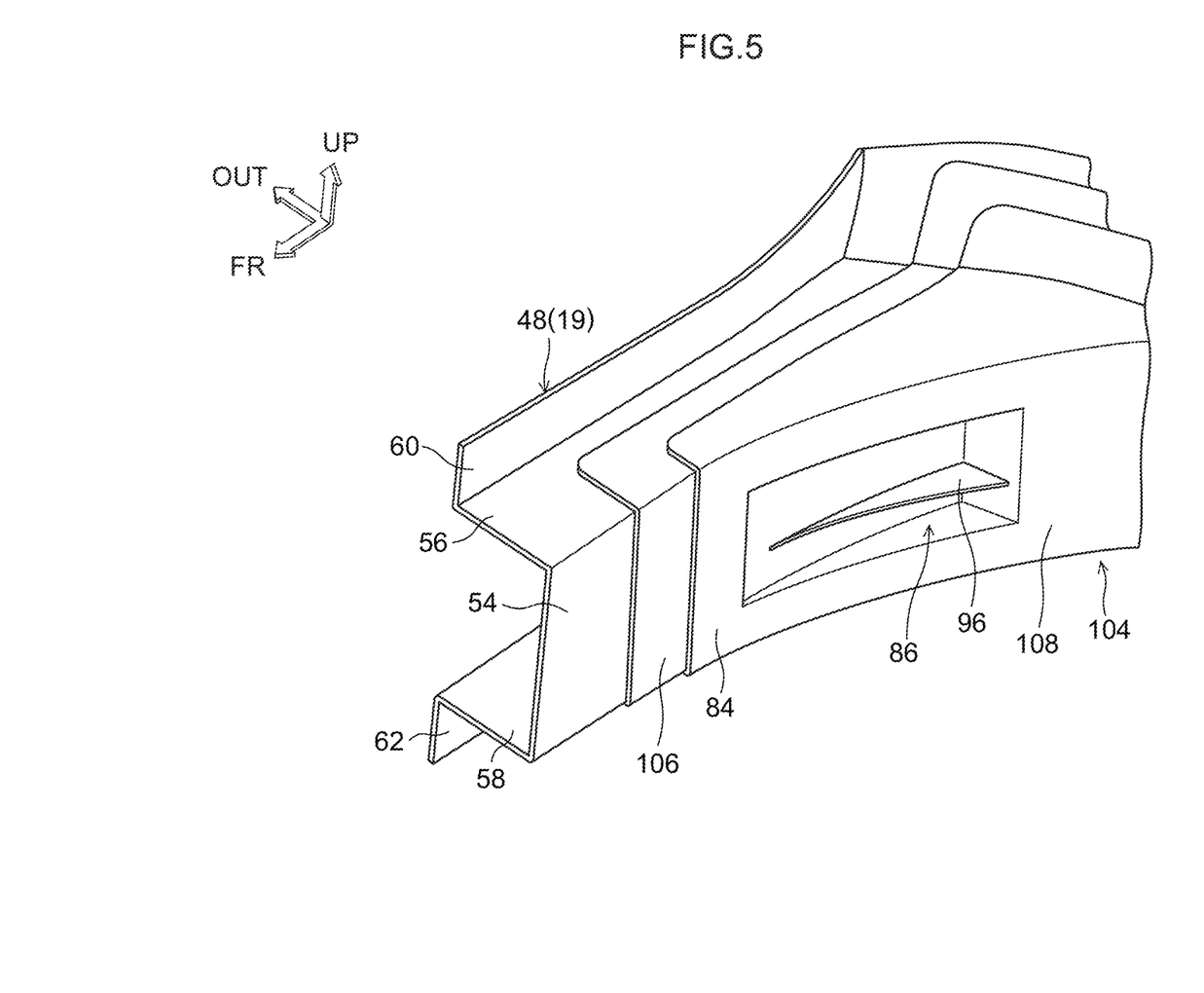
FIG. 5 is a perspective view illustrating relevant portions of a first modified example of a joint section between a rocker rear and a rear floor side member applied with a vehicle body structure according to an exemplary embodiment of the present disclosure.

Note that in the exemplary embodiment described above, the rear floor side member 20 is a die-cast aluminum member. However, the rear floor side member 20 does not necessarily have to be a member formed entirely of die-cast aluminum. For example, as illustrated in FIG. 5, a metal panel 106 configured from a ferrous metal, an aluminum alloy, or the like may be provided at the periphery of a die-cast aluminum rear floor side member 104. Such a metal panel 106 may be formed from the same material as a rear floor side member body 108, or may be formed from a different material thereto.

The metal panel 106 is joined to the rocker rear inner 48. In comparison to die-cast members, the metal panel 106 enables flat faces to be more easily secured for the joining faces, and configuration such as this modified example is capable of obtaining substantially the same effects as the effects of the exemplary embodiment described above.

Although explanation has been given regarding an example of an exemplary embodiment of the present disclosure, exemplary embodiments of the present disclosure are not limited to the above, and obviously the exemplary embodiments and various modified examples may be employed in appropriate combinations, or various embodiments may be implemented within a range not departing from the spirit of the present disclosure.

What is claimed is:

1. A vehicle body structure, comprising:
   a die-cast rear floor side member that extends along a vehicle front-rear direction at an end portion, in a vehicle width direction, of a vehicle rear section; and
   a rocker rear inner that is provided at a rear side, in the vehicle front-rear direction, of a rocker extending along the vehicle front-rear direction at a vehicle side section, the rocker rear inner configuring an inner side, in the vehicle width direction, of a metal rocker rear having a cross-section profile sectioned along a vehicle vertical direction and the vehicle width direction of a profile formed with a closed cross-section area, and the rocker rear inner being joined to a front end portion, in the vehicle front-rear direction, of the rear floor side member;
   a joint section, at which the rocker rear inner and the vehicle front-rear direction front end portion of the rear floor side member are joined together, including:
      a first joint location at an upright wall configuring an inner side, in the vehicle width direction, of the rocker rear inner and extending along the vehicle vertical direction and the vehicle front-rear direction, and
      a second joint location at an outer joint section that is formed at the vehicle front-rear direction front end portion of the rear floor side member, that has an open cross-section profile, when sectioned along the vehicle vertical direction and the vehicle width direction, that is open toward an outer side in the vehicle width direction, that covers the rocker rear inner from the vehicle width direction inner side and that is joined to the rocker rear inner in a state in which a gap is provided between the outer joint section and the upright wall.

2. The vehicle body structure of claim 1, wherein a recess recessed toward the upright wall side is provided at the outer joint section such that a recess-bottom wall is abutted against and joined to the upright wall.

3. The vehicle body structure of claim 2, wherein a rib linked to a sidewall of the recess is formed along the vehicle front-rear direction inside the recess.

4. The vehicle body structure of claim 3, wherein respective joint locations are provided inside the recess at positions at an upper side, in the vehicle vertical direction, and at a lower side, in the vehicle vertical direction, of the rib.

5. The vehicle body structure of claim 1, wherein:
   the rocker rear inner further includes:
      an upper wall provided at an upper side, in the vehicle vertical direction, of the upright wall and linked to the upright wall, and
      a lower wall provided at a lower side, in the vehicle vertical direction, of the upright wall, and linked to the upright wall so as to be disposed opposing the upper wall; and
   the outer joint section further includes:
      a joint upper wall abutted against and joined to the upper wall, and
      a joint lower wall abutted against and joined to the lower wall.

6. The vehicle body structure of claim 1, wherein a metal panel is provided at a periphery of the rear floor side member.

* * * * *